United States Patent
Hsieh et al.

(10) Patent No.: US 11,079,965 B2
(45) Date of Patent: Aug. 3, 2021

(54) DATA PROCESSING METHOD FOR COMPUTER SYSTEM WITH SOLID STATE DRIVE

(71) Applicants: Lite-On Electronics (Guangzhou) Limited, Guangzhou (CN); LITE-ON TECHNOLOGY CORPORATION, Taipei (TW)

(72) Inventors: Shih-Hung Hsieh, Taipei (TW); Yu-Cheng Kao, Taipei (TW); Sung-Hung Wu, Taipei (TW); I-Hsiang Chiu, Taipei (TW)

(73) Assignee: SOLID STATE STORAGE TECHNOLOGY CORPORATION, Taipei (TW)

( * ) Notice: Subject to any disclaimer, the term of this patent is extended or adjusted under 35 U.S.C. 154(b) by 277 days.

(21) Appl. No.: 16/515,617

(22) Filed: Jul. 18, 2019

(65) Prior Publication Data
US 2020/0387327 A1    Dec. 10, 2020

(30) Foreign Application Priority Data

Jun. 5, 2019    (CN) .......................... 201910484742.9

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2009/0319720 A1* | 12/2009 | Stefanus | G06F 12/0246 711/103 |
| 2017/0371559 A1* | 12/2017 | Higgins | G06F 3/0673 |
| 2019/0056994 A1* | 2/2019 | Shulkin | G11C 29/52 |
| 2019/0108888 A1* | 4/2019 | Sarkar | G11C 16/349 |

* cited by examiner

*Primary Examiner* — Denise Tran
(74) *Attorney, Agent, or Firm* — WPAT, PC

(57) ABSTRACT

A data processing method for a computer system is provided. The computer system includes a host and an open-channel solid state drive. The open-channel solid state drive is connected with the host. The data processing method includes the following steps. Firstly, plural block characteristic parameters of a specified block in a non-volatile memory of the open-channel solid state drive are collected. Then, the plural block characteristic parameters are inputted into a prediction function, so that a prediction value is acquired. If the prediction value exceeds a threshold value, a data in the specified block of the non-volatile memory is moved to a blank block of the non-volatile memory by the host.

9 Claims, 2 Drawing Sheets

DATA PROCESSING METHOD FOR COMPUTER SYSTEM WITH SOLID STATE DRIVE

This application claims the benefit of People's Republic of China Patent Application No. 201910484742.9, filed Jun. 5, 2019, the subject matter of which is incorporated herein by reference.

FIELD OF THE INVENTION

The present invention relates to a data processing method for a computer system with the solid state drive, and more particularly to a data processing method for a computer system with an open-channel solid state drive (OC SSD).

BACKGROUND OF THE INVENTION

As is well known, solid state drives (SSD) such as SD cards are widely used in various electronic devices. Generally, a solid state drive comprises a controlling circuit and a non-volatile memory.

FIG. 1 is a schematic functional block diagram illustrating the architecture of a conventional computer system. As shown in FIG. 1, the computer system 100 comprises a host 110 and a solid state drive 120. The solid state drive 120 comprises a control circuit 122 and a non-volatile memory (NVM) 124.

The host 110 is connected with the solid state drive 120 through a bus 130. For example, the bus 130 is an USB bus, a SATA bus, a PCIe bus, a M.2 bus, an U.2 bus, or the like.

For example, a NVM access driver 114 is loaded into the memory of the host 110. When the computer system 100 is in the normal working state, the host 110 uses the NVM access driver 114 to access the solid state drive 120.

When the host 110 intends to write a data into the solid state drive 120, the host 110 uses the NVM access driver 114 to issue a write command, a corresponding logical block address and a write data to the solid state drive 120. Moreover, the logical block address is converted into a physical block address by a flash translation layer (FTL) 126 of the control circuit 122 according to a mapping table. After an error correction code (ECC) encoding operating is performed on the write data, the encoded write data is written into the corresponding physical block address of the non-volatile memory 124.

When the host 110 intends to read a data from the solid state drive 120, the host 110 uses the NVM access driver 114 to issue a read command and a corresponding logical block address to the solid state drive 120. Moreover, the logical block address is converted into a physical block address by the control circuit 122 according to the mapping table of the flash translation layer 126. In addition, the control circuit 122 acquires an encoded read data from the non-volatile memory 124 at the physical block address. After an error correction code (ECC) decoding operating is performed on the encoded read data, the generated read data is transmitted to the host 110.

Generally, the flash translation layer 126 is a firmware algorithm that is installed in the solid state drive 120 and executed by the control circuit of the solid state drive 120. As mentioned above, the flash translation layer 126 is used for converting the logical block address into the physical block address, performing the ECC encoding operation and performing the ECC decoding operation. In addition, the flash translation layer 126 is capable of performing a garbage collection operation and a wear leveling operation on the non-volatile memory 124 at the proper time.

Since the flash translation layer 126 is managed by the control circuit 122 of the solid state drive 120, the process of converting the logical block address into the physical block address, the garbage collection operation and the wear leveling operation are all implemented in the solid state drive 120. In other words, the host 110 of the conventional computer system 100 is unable to request the solid state drive 120 to perform the garbage collection operation and the wear leveling operation directly.

As mentioned above, the manufacturer of the solid state drive 120 has to develop the firmware algorithm of the flash translation layer 126 and apply the flash translation layer 126 to the self-developed solid state drive 120. In other words, the firmware algorithm of the flash translation layer developed by the specified manufacturer cannot be applied to the solid state drives of other manufacturers.

SUMMARY OF THE INVENTION

An embodiment of the present invention provides a data processing method for a computer system. The computer system includes a host and an open-channel solid state drive. The open-channel solid state drive is connected with the host. The data processing method includes the following steps. Firstly, plural block characteristic parameters of a specified block in a non-volatile memory of the open-channel solid state drive are collected. Then, the plural block characteristic parameters are inputted into a prediction function, so that a prediction value is acquired. If the prediction value exceeds a threshold value, a data in the specified block of the non-volatile memory is moved to a blank block of the non-volatile memory by the host.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Recently, an open-channel solid state drive (OC SSD) has been developed. Generally, the open-channel solid state drive is not equipped with the flash translation layer. The firmware algorithm of the flash translation layer is executed by the host. Consequently, the host is capable of directly managing the non-volatile memory.

Figure 2:
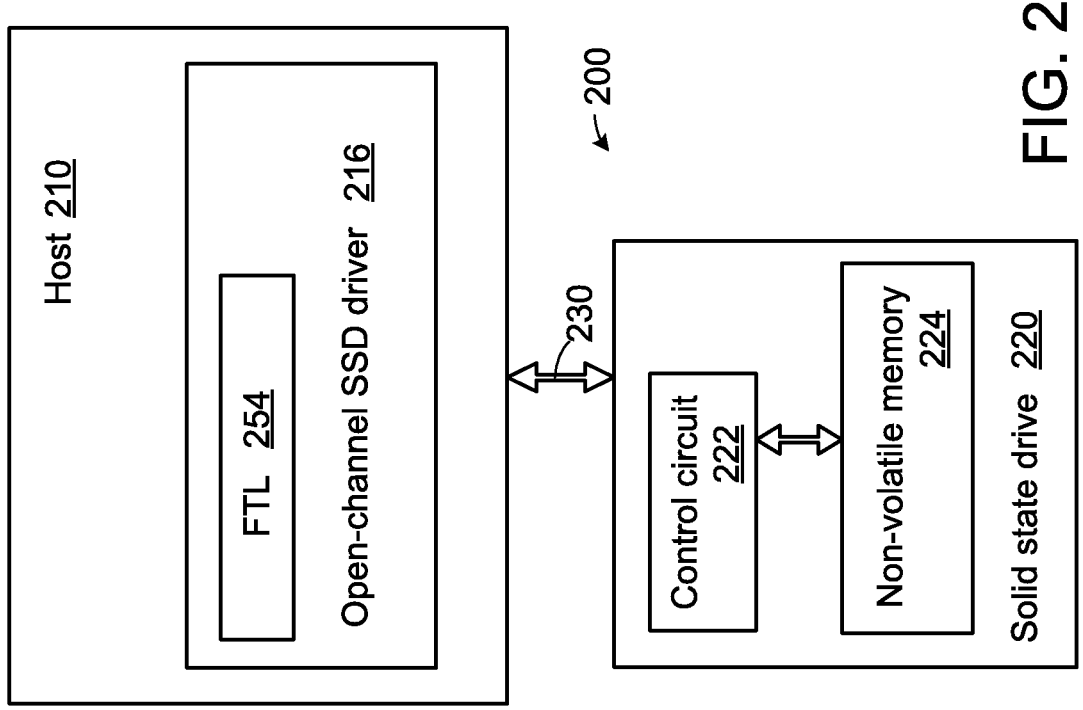
FIG. 2 is a schematic functional block diagram illustrating the architecture of a computer system with an open-channel solid state drive according to an embodiment of the present invention.
Figure 1:
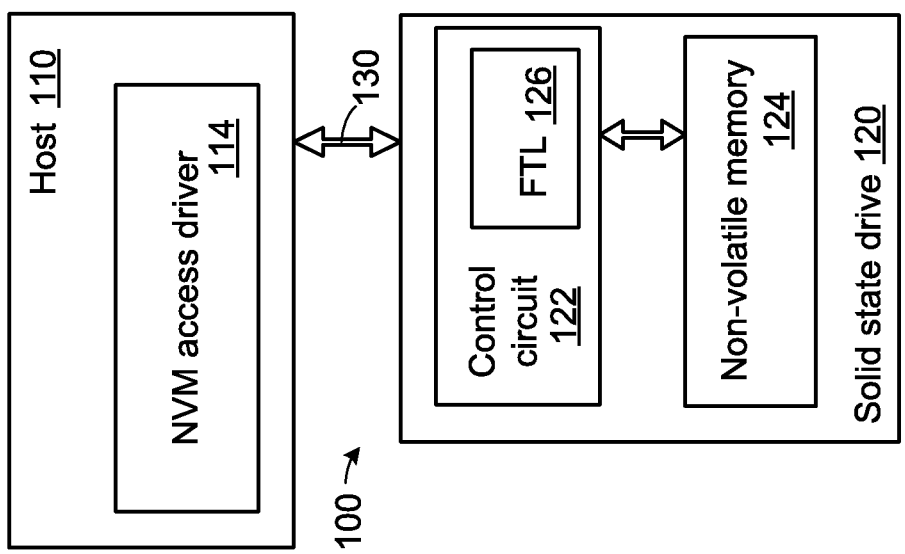
FIG. 1 (prior art) is a schematic functional block diagram illustrating the architecture of a conventional computer system.

FIG. 2 is a schematic functional block diagram illustrating the architecture of a computer system with an open-channel solid state drive according to an embodiment of the present invention. As shown in FIG. 2, the computer system 200 comprises a host 210 and a solid state drive 220. In this embodiment, the solid state drive 220 is an open-channel solid state drive.

The host 210 is connected with the solid state drive 220 through a bus 230. For example, the bus 230 is an USB bus, a SATA bus, a PCIe bus, a M.2 bus, an U.2 bus, or the like.

In this embodiment, an open-channel SSD driver 216 is loaded into the host 210. When the computer system 200 is in the normal working state, the host 210 uses the open-channel SSD driver 216 to manage the solid state drive 220. The open-channel SSD driver 216 comprises a flash translation layer (FTL) 254.

Since the open-channel SSD driver 216 has been loaded into the host 210, the host 210 can access the data which located in any physically address of a non-volatile memory 224.

When the host 210 intends to write a data into the non-volatile memory 224 of the solid state drive 220, the open-channel SSD driver 216 receives a write request from the host 210. Moreover, the logical block address is converted into a physical block address by the flash translation layer (FTL) 254 according to a mapping table. Then, an error correction code (ECC) encoding operating is performed on the write data by the flash translation layer 254. Then, the open-channel SSD driver 216 issues a write command, the corresponding physical block address and a encoded write data to the solid state drive 220. Consequently, the encoded write data is written into the corresponding physical block address of the non-volatile memory 224 by a control circuit 222.

When the host 210 intends to read a data from the non-volatile memory 224 of the solid state drive 220, the open-channel SSD driver 216 receives a read request from the host 210. Moreover, the logical block address is converted into a physical block address by the flash translation layer 254 according to the mapping table. Then, the open-channel SSD driver 216 generates a read command and the corresponding physical block address to the solid state drive 220. Consequently, the control circuit 222 acquires an encoded read data from the non-volatile memory 224 at the physical block address and transmits the encoded read data to the open-channel SSD driver 216. After an error correction code (ECC) decoding operating is performed on the encoded read data by the flash translation layer 254, the generated read data is transmitted to the host 210.

As mentioned above, the host 210 of the computer system 200 can access the data of the non-volatile memory 224 of the solid state drive 220 directly. In addition, the host 210 has to maintain the data of the non-volatile memory 224 in order to prevent from the data loss of the non-volatile memory 224.

For example, after the write data is stored into the non-volatile memory 224 by the host 210, the possibility of causing the data loss problem increases with the increasing data retention time. Under this circumstance, the solid state drive 220 is in a data retention failure mode. For preventing from the data retention failure, a prediction equation is applied to the computer system with the open-channel solid state drive.

Generally, as the ambient temperature of the solid state drive 220 increases, the risk of causing the data loss problem of the non-volatile memory 224 increases. Moreover, the number of times for the host 210 to access the data of the non-volatile memory 224 is a factor that results in the data loss problem. Of course, the read retry rate of the data is another factor that results in the data loss problem.

After various tests and experiments are performed on the non-volatile memory 224, a prediction function is acquired. The prediction function is applied to the open-channel SSD driver 216 of the host 210. In other words, the host 210 can estimate the state of the non-volatile memory 224 according to the prediction function. If the host 210 judges that the data loss risk of a specified block of the non-volatile memory 224 is high according to the prediction function, the data of the specified block is moved to a blank block in advance.

Figure 3:
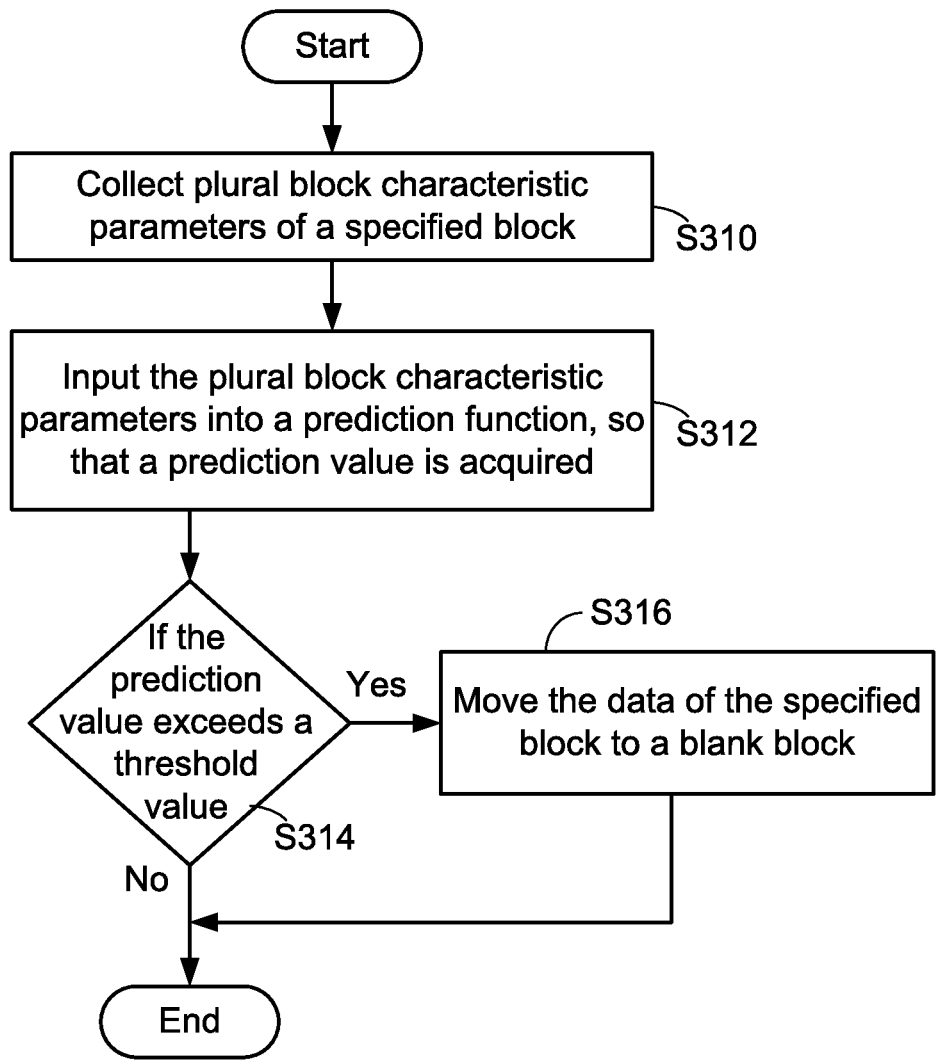
FIG. 3 is a flowchart illustrating a data processing method for the computer system of the present invention.

FIG. 3 is a flowchart illustrating a data processing method for the computer system of the present invention. Firstly, the host 210 collects plural block characteristic parameters of a specified block of the non-volatile memory 224 (Step S310). Then, these block characteristic parameters are inputted into a prediction function, and thus a prediction value is acquired (Step S312). If the prediction value does not exceed a threshold value (Step S314), the flowchart is ended. Whereas, if the prediction value exceeds the threshold value (Step S314), the data in the specified block of the non-volatile memory 224 is moved to a blank block (Step S316) and the flowchart is ended.

In an embodiment, the prediction function is expressed by the following formula:

$$P=(\alpha \times \text{Write}_{consecutive} \times T)+(\beta \times T)+(\gamma \times \text{Read}_{consecutive} \times \text{Rate}_{Retry})+(\delta \times \text{Rate}_{Retry})$$

In the above formula, $\alpha$, $\beta$, $\gamma$ and $\delta$ are weights, and T, $\text{Write}_{consecutive}$, $\text{Read}_{consecutive}$ and $\text{Rate}_{Retry}$ are block characteristic parameters. Moreover, T is the operating temperature of the solid state drive 220 or the operating temperature of the specified block, $\text{Write}_{consecutive}$ is the write operation count, $\text{Read}_{consecutive}$ is the read operation count, and $\text{Rate}_{Retry}$ is the read retry rate.

For example, the operating temperature of the solid state drive 220 or the operating temperature of the specified block is t. In a specified time period, the host 210 performs the write operation on the specified block for M times, the host 210 performs the read operation on the specified block for N times, and the read retry rate of the specified block is r %. Consequently, the host 210 acquires the prediction value according to the prediction function $P=(\alpha \times M \times t)+(\beta \times t)+(\gamma \times N \times r\ \%)+(\delta \times r\ \%)$.

If the prediction value is smaller than the threshold value, it means that the data in the specified block of the non-volatile memory 224 has no loss risk. Consequently, it is not necessary to process the data in the specified block. Whereas, if the prediction value is not smaller than the threshold value, it means that the data in the specified block of the non-volatile memory 224 has the loss risk. Then, the data in the specified block of the non-volatile memory 224 is moved to a blank block by the host 210. Consequently, the data loss problem is overcome.

The prediction function P contains plural block characteristic parameters. For example, the block characteristic parameters include the block erase count, the program time, the erase time, and so on.

In the computer system 200 of the present invention, the prediction function P is installed in the open-channel SSD driver 216 and executed by the host 210. While the host 210 collects the block characteristic parameters, the host 210 has to issue a request to the solid state drive 220 and wait for the response signal from the control circuit 222. After the response signal is received, the host 210 acquires the block characteristic parameters of the specified block.

For example, after the host 210 issues an operating temperature inquiry request to the solid state drive 220, the operating temperature t of the solid state drive 220 is sent from the control circuit 222 to the host 210. In an embodiment, the operating temperature t of the solid state drive 220 is the operating temperature of the specified block of the non-volatile memory 224.

Generally, the operating temperature t is related to the physical block address. For example, the physical block address in the non-volatile memory 224 is related to the specified block. For acquiring the more accurate prediction value of the prediction function P, the operating temperature inquiry request corresponding to the specified physical block address is issued from the host 210 to the solid state drive 220. In response to the operating temperature inquiry request, the operating temperature t of the specified block of the non-volatile memory 224 is transmitted from the control circuit 222 to the host 210.

For reducing the burden of the host 210, a read retry rate inquiry request corresponding to the specified physical block address is issued from the host 210 to the solid state drive 220. In response to the read retry rate inquiry request, the read retry rate of the specified block is calculated by the control circuit 222 and transmitted to the host 210.

After the block characteristic parameters of the specified block are collected by the host 210, the block characteristic parameters are inputted into the prediction function P. Consequently, the prediction value is acquired. According to the prediction value, the host 210 judges whether the data in the specified block of the non-volatile memory 224 needs to be moved to a blank block or not.

From the above descriptions, the present invention provides a data processing method for a computer system with an open-channel solid state drive. The host 210 of the computer system 200 collects plural characteristic parameters of a specified block of the solid state drive 220. Moreover, the prediction equation is used for preventing from the data retention failure of the specified block.

It is noted that numerous modifications and alterations may be made while retaining the teachings of the invention. For example, in another embodiment, the prediction function is stored in the control circuit 222 of the open-channel solid state drive 220. After a prediction value inquiry request corresponding to the specified block is issued from the host 210 to the solid state drive 220, the control circuit 222 collects the plural block characteristic parameters of the specified block and inputs the block characteristic parameters into the prediction function. After the prediction value of the specified block is calculated by the control circuit 222, the host 210 judges whether the data in the specified block of the non-volatile memory 224 needs to be moved to a blank block according to the prediction value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data processing method for a computer system, the computer system comprising a host and an open-channel solid state drive, the open-channel solid state drive being connected with the host, the data processing method comprising steps of:

collecting plural block characteristic parameters of a specified block in a non-volatile memory of the open-channel solid state drive;

inputting the plural block characteristic parameters into a prediction function, so that a prediction value is acquired; and judging whether the prediction value exceeds a threshold value, wherein if the prediction value exceeds the threshold value, a data in the specified block of the non-volatile memory is moved to a blank block of the non-volatile memory by the host.

2. The data processing method as claimed in claim 1, wherein the plural block characteristic parameters include an operating temperature of the open-channel solid state drive, a read retry rate of the specified block, a write operation count of the specified block in a specified time interval and a read operation count of the specified block in the specified time interval.

3. The data processing method as claimed in claim 2, wherein after the host issues an operating temperature inquiry request to the open-channel solid state drive, the operating temperature of the open-channel solid state drive is transmitted from a control circuit of the open-channel solid state drive to the host.

4. The data processing method as claimed in claim 3, wherein the operating temperature is an operating temperature of the specified block in the non-volatile memory, and the operating temperature of the specified block in the non-volatile memory is transmitted from the control circuit to the host according to a specified physical block address.

5. The data processing method as claimed in claim 2, wherein after a read retry rate inquiry request corresponding to the specified physical block address is issued from the host to the open-channel solid state drive, a control circuit of the open-channel solid state drive calculates a read retry rate of the specified block and transmits the read retry rate to the host.

6. The data processing method as claimed in claim 2, wherein the prediction value is expressed by a formula: $P=(\alpha \times M \times t)+(\beta \times t)+(\gamma \times N \times r \%)+(\delta \times r \%)$, wherein P is the prediction value, $\alpha$ is first weight, $\beta$ is a second weight, $\gamma$ is a third weight, $\delta$ is a fourth weight, M is the write operation count, t is the operating temperature, N is the read operation count, and r is the read retry rate.

7. The data processing method as claimed in claim 1, wherein the plural block characteristic parameters include a block erase count, a program time and an erase time of the specified block.

8. The data processing method as claimed in claim 1, wherein the host comprises an open-channel solid state drive driver, and the prediction function is included in the open-channel solid state drive driver, wherein after the plural block characteristic parameters are collected by the host and inputted into the prediction function, the prediction value is acquired.

9. The data processing method as claimed in claim 1, wherein the prediction function is installed in the control circuit, wherein after a prediction value inquiry request corresponding to the specified block is issued from the host to the solid state drive, the control circuit collects the plural block characteristic parameters of the specified block and inputs the block characteristic parameters into the prediction function, so that the prediction value is acquired.

* * * * *